United States Patent
Blum

(10) Patent No.: US 8,675,251 B2
(45) Date of Patent: Mar. 18, 2014

(54) MULTILEVEL PRINTING PROCESS AND DEVICE USING A RASTER BITMAP AND ASSIGNMENT METHOD FOR MULTILEVEL SCREENS

(75) Inventor: Dietrich Blum, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 572 days.

(21) Appl. No.: 12/966,074

(22) Filed: Dec. 13, 2010

(65) Prior Publication Data

US 2011/0141503 A1   Jun. 16, 2011

(30) Foreign Application Priority Data

Dec. 11, 2009   (DE) .................. 10 2009 057 973

(51) Int. Cl.
*H04N 1/60* (2006.01)
(52) U.S. Cl.
USPC .................. 358/1.9; 358/3.13; 358/535
(58) Field of Classification Search
USPC ............... 358/1.1, 1.9, 3.01, 3.06, 3.09, 3.12, 358/3.13, 534, 535, 536
See application file for complete search history.

(56) References Cited

U.S. PATENT DOCUMENTS

| 6,900,908 | B1 | 5/2005 | Brady et al. |
| 6,942,310 | B2 | 9/2005 | Kanda et al. |
| 7,417,768 | B1 | 8/2008 | Donovan et al. |
| 7,505,177 | B2 | 3/2009 | Wechgeln et al. |
| 7,515,303 | B2 | 4/2009 | Hansen et al. |
| 2004/0218221 | A1 | 11/2004 | Hirano et al. |
| 2007/0236741 | A1* | 10/2007 | Tai et al. .................. 358/3.12 |

FOREIGN PATENT DOCUMENTS

WO   2009136942 A1   11/2009

OTHER PUBLICATIONS

German Search Report dated Aug. 27, 2010.

* cited by examiner

Primary Examiner — Thomas D Lee
(74) Attorney, Agent, or Firm — Laurence A. Greenberg; Werner H. Stemer; Ralph E. Locher

(57) ABSTRACT

A process for printing substrates includes assigning image dots of printer-ready copy to pixels of a multilevel map and assigning values to the pixels depending on the tonal value of the image dot for assigning n+1 different values, where n>1. Artifacts are prevented in multilevel printing processes by assigning threshold values of any threshold value matrix to the pixels of the multilevel map on which the printing is based with respect to their positions relative to the printing substrate, calculating tonal values of the image dot, fixing the values of the pixels depending on the threshold value and the tonal value of the assigned image dot, and printing the multilevel map on a printing substrate in a multilevel printing process, with different values representing different amounts of ink of a printed pixel. A screen assignment device assigns a value to a pixel of a multilevel map generated by an RIP.

10 Claims, 4 Drawing Sheets

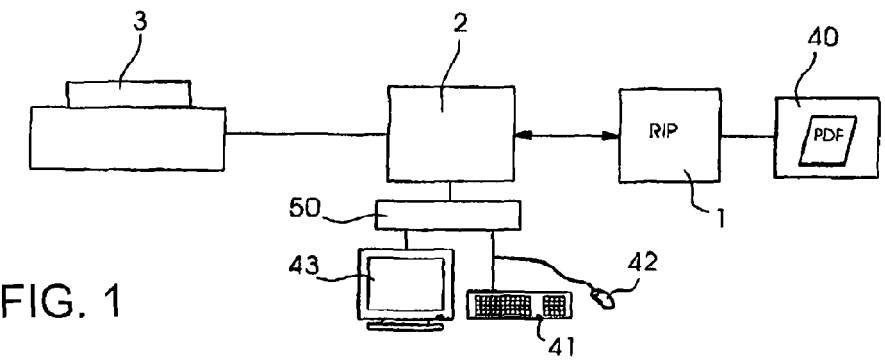
FIG. 1
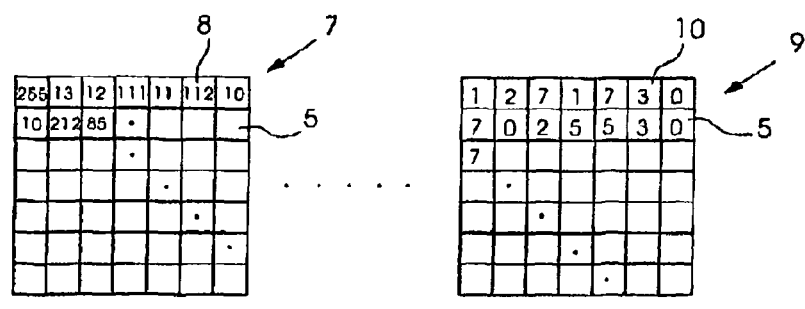
FIG. 2A  FIG. 2B
FIG. 2C

MULTILEVEL PRINTING PROCESS AND DEVICE USING A RASTER BITMAP AND ASSIGNMENT METHOD FOR MULTILEVEL SCREENS

CROSS-REFERENCE TO RELATED APPLICATION

This application claims the priority, under 35 U.S.C. §119, of German Patent Application DE 10 2009 057 973.7, filed Dec. 11, 2009; the prior application is herewith incorporated by reference in its entirety.

BACKGROUND OF THE INVENTION

Field of the Invention

The present invention relates to a process for printing printing substrates, in which image dots of a printer-ready copy are assigned to pixels of a multilevel map and values are assigned to the pixels depending on a tonal value of the image dot, wherein it is possible for n+1 different values, where n>1, to be assigned to each pixel. The invention furthermore relates to a device including a printing machine and a raster image processor for carrying out the process.

Different printing processes are known in the graphics industry, on one hand using conventional printing forms to create a printed image, and printing processes without such printing forms, so-called non-impact printing processes. The conventional printing processes using printing forms include, for example, screen printing, letterpress printing, offset printing, and gravure printing. Known non-impact printing processes include electrophotography, thermographic printing or inkjet printing. In particular, in the case of inkjet printing, the printing machine provided for that purpose, an inkjet printer, is capable of generating many shades of gray per pixel, for example in such a way that many droplets are collected on a pixel. Approximately 30 shades of gray are thus perfectly possible with continuous inkjet systems. Such printing processes with many shades of gray per pixel are referred to below as multilevel printing processes. Multilevel maps form the basis of such multilevel printing processes in this connection, since for that process too, first a printer-ready copy which may be in digital form is rasterized and different values, i.e. levels of gray in their color separations, are assigned to the individual pixels. The pixels thus correspond to the smallest elements that are to be written or which can be imaged.

As with conventional printing processes, digital printer-ready copy is also known in multilevel printing processes such as, for example, inkjet printing. The digital printer-ready copy can be created by bringing together, in a page layout, digital images or scanned-in images together with text and graphics created in a text processing system or a graphics program and, after impositioning with color separation into the printing colors being used, by creating bitmaps using a raster image processor (RIP). The bitmaps serve, through the use of a control system for the printing machine, as actuating signals for printing or imaging a printing substrate such as, for example, paper or cardboard or foil. However, since many values are possible in that case per pixel, the term multilevel map is preferred for the rasterized image. The term bytemaps is sometimes also found in the literature. When reference is made to the color-separated creation of multilevel maps, it should thereby, in particular, also be understood that the data of the different printing colors, i.e. the color separations, are also stored in a common individual multilevel map. For example, the values of the associated printing colors can be disposed alternatingly in the multilevel map, which is known, for example, by the terms "pixel interleaved," "line interleaved," "band interleaved" or the like. The same also applies for bitmaps.

In bilevel printing processes such as, for example, offset printing, the individual color separations are represented by raster bitmaps in which a bit is assigned to each pixel of the imaging system of a printing form, in particular of a printing plate, which provides information as to whether or not that pixel will be imaged. Depending on the technology used, a 0 means that this pixel is not to be imaged and a 1 that it is to be exposed, or vice versa. A printing form generated in that way, which for example can be imaged in an external drum imagesetter, can be inserted into an offset printing machine, inked with color and used for printing sheets.

In the multilevel printing processes described, such as, for example, the inkjet printing process, many shades of gray, i.e. many values, can be assigned to a pixel. The individual values that are thus assigned to a pixel are described by many bits. Thus, not only the values 0 and 1 but all possible tonal values, can be mapped by the multilevel rasterization process. For example, if in an inkjet process a maximum of 31 can be applied to a pixel, then 32 different tonal values can be mapped. That then results in the numbers 0 to 31 for the values assigned to the individual pixel. They can be saved in a corresponding rasterized image, a multilevel map with 5 bits for each individual color separation of the colors being used.

In particular, it is also possible to map different tonal values in a multilevel process, not only by a plurality of ink drops of equal size but also to do so through the use of ink drops of differing size.

In inkjet processes, a printing head is used which supplies a specific color, with that color corresponding to a color separation. The number of the colors used normally corresponds to the number of the printing heads used or to a multiple in the case of multiple printing heads per color and results in the same number of color separations. A relative movement between the printing substrate and the printing head is necessary for printing a printing substrate. That can be effected on one hand by the movement of the printing head or by the movement of the printing substrate or both. For example, a printing head can be constructed in such a way that it extends over the entire width of the printing substrate, i.e. over the width of, for example, a printing sheet or a web of paper. The printing substrate is then moved along in the printing machine beneath the printing head. The speed and the frequency with which droplets from the printing head can be applied to the printing substrate then determine the possible resolution of the printed image and the number of the ink levels, i.e. the tonal values of the individual color separations. In the case of a continuous tone inkjet printing head, the desired tonal value of a pixel is obtained by the number of ink droplets which are not deflected. In the case of a drop-on-demand inkjet printing head, only that many ink droplets are "fired off" as are necessary for the tonal value obtained. The continuous inkjet is preferred in industrial printing machines.

A printing head for an inkjet printing process thus is formed of a feed system, one or more chambers for supplying the ink and a plurality of openings through which the ink is applied to the printing substrate. Depending on the process used and depending on the technology used, devices are provided for forming droplets which are emitted through the openings. Deflection systems, which, for example, work electrostatically, may also be provided in the region of the opening in order to deflect droplets of ink which are not meant to reach the printing substrate. The openings of an inkjet printing head can then be disposed uniformly, in particular in the form of a matrix with many rows and columns, so that it is then possible for the matrix to extend over the entire width of the printing substrate, possibly in a stepped manner or overlapping fashion in several sections.

A problem with the use of such printing heads is the existence of manufacturing tolerances in, for example, the mutual spacing between the nozzles and the diameter of the nozzles themselves. That results in deviations with regard to the size of the droplets emitted through the nozzles and in their spacing. Those systemic weaknesses of the inkjet printing heads can result in quality defects such as, for example, banding, in particular in the case of flat surfaces, i.e. areas of the printed image or of the printer-ready copy where the aim is a constant tonal value.

In order to prevent such banding, it is disclosed, for example, from U.S. Pat. No. 6,942,310 B2, to image the individual pixels in a multi-pass process. That is referred to as multi-pass printing. The repeated overprinting or adjacent printing of many droplets from different nozzles thereby at least reduces the problem described. However, in order to do that it is necessary to image the printing substrate in such areas many times, which, for example, can be achieved by the repeated passing of the printing substrate through the printing area of the inkjet printing heads. Loss of speed in the printing process, in particular, has to be accepted as a result.

SUMMARY OF THE INVENTION

It is accordingly an object of the invention to provide a multilevel printing process and device using a raster bitmap and assignment method for multilevel screens, which overcome the hereinafore-mentioned disadvantages of the heretofore-known processes and devices of this general type and which at least reduce the lack of quality described in multilevel printing processes, wherein the process can at the same time be applied in so-called single-pass printing processes, i.e. when the printing substrate passes through the printing area of the printing head a single time.

With the foregoing and other objects in view there is provided, in accordance with the invention, a process for printing printing substrates. The process comprises assigning pixels of a multilevel map to image dots of a printer-ready copy and assigning values to the pixels depending on a tonal value of the image dot, permitting n+1 different values to be assigned to each pixel, where n is greater than 1, representing different amounts of ink of a printed pixel with the different values, assigning threshold values of any threshold value matrix to the pixels of the multilevel map with respect to their positions relative to the printing substrate, calculating tonal values of the image dot with color separation, fixing the values of the pixels depending on the threshold value and on the tonal value of the assigned image dot, and printing the multilevel map on a printing substrate in a multilevel printing process.

Thus, the printer-ready or printing copy is rasterized with color separation after a rasterization process in such a way that a multilevel map results with pixels which can assume n+2 states, for example 0 to n+1. The values of these states thus represent the differing amounts of ink of a printed pixel.

Threshold values of a threshold value matrix are assigned to the pixels of the multilevel map with respect to their position relative to the printing substrate. Any threshold value matrix can be chosen depending on the type of the desired screen.

The threshold value matrix of any type can be known, for example, from rasterization processes which, for example, are used for offset printing. For example, threshold value matrices from FM or AM screens can be used, in which it is possible to vary the screen angle and the screen ruling. In order to create the threshold value matrices, optimization processes can, in particular, be used which, for example, transfer a specific offset screen to another screen or allow specific irrational angles for the threshold value matrix, as is described, for example, in European Patent EP 0 990 343 B1, corresponding to U.S. Pat. No. 6,687,021.

It is thus, in particular, irrelevant what kind of threshold value matrix with what kind of configuration of threshold values is used for the process. It can thus, for example, also be possible for an operator to be able to determine or further manipulate the threshold value matrix.

Furthermore, the tonal values of the image dots to be rasterized are calculated so that the values of the pixels of the multilevel map can then be fixed depending on these tonal values and the assigned threshold values.

The calculation of tonal values and the fixing of the values of the pixels of the multilevel map are then preferably carried out with color separation.

In conclusion, it is provided according to the invention that a print image is generated on a printing substrate on the basis of the multilevel map so generated, in which a printing process is used therefor which is capable, for each color separation, of covering the individual screen dots on the printing substrate with n+1 different amounts of ink, as a result of which a total of n+2 different tonal values of a color separation can be represented. This printing process can, in particular, be inkjet printing. In general, such processes are referred to herein as multilevel printing processes.

It can, in particular, be provided that this inkjet printing process is used in the context of an offset printing process when, for example, personalized data or images need to be applied to a printing substrate printed with offset printing. It can thereby, in particular, be provided that the same threshold value matrices are used in each case to create the printing forms of the offset printing and to create the inkjet printing.

The use of known threshold value matrices, for example from offset printing, can allow the distribution of printed tonal values for the individual pixels to be configured more variably for the multilevel printing process. The dominance of individual openings of the printing head of the printing process is hereby reduced so that disruptive influences from the systemic fluctuations in the size of the droplets or the spacing of the openings no longer apply. Furthermore, the positive properties of the threshold value matrices known from offset printing can thus be introduced into the multilevel rasterization process.

In accordance with another mode of the invention, in order to vary the distribution of the threshold values as effectively as possible, so that a distribution of the ink coverage required for the resulting tonal value of the image dot is achieved which levels out the errors of individual openings as much as possible, it is provided according to the invention that an assignment protocol is established, according to which values are assigned to the pixels depending on the tonal value and threshold value of the threshold value matrix in such a way that the values of at least two pixels in the multilevel map deviate from each other. All in all, it can also advantageously be provided that the assignment of the values to the pixels of the multilevel map takes place depending on the tonal value of a larger area of printing dots of the printer-ready copy.

In accordance with a further mode of the invention since, as already described, the values of at least two pixels in the multilevel map need to deviate from each other, in a particularly preferred embodiment of the invention, these deviations in turn need themselves to be dependent on the threshold values and/or on the tonal value of the image dots. For critical tonal value areas, the deviations of the individual values of the pixels in the multilevel map can thus be varied more or less appreciably. The described systemic errors can be better eliminated by an appropriate distribution of the tonal values for a predetermined value of an image dot.

In accordance with an added mode of the invention, it is provided, for carrying out the process, that the threshold values of the threshold value matrix are initially sorted in increasing or decreasing order. They thus virtually represent the X-axis, i.e. the abscissa axis of a 2D graph. Moreover, each threshold value is thus assigned its xy value for the imaging of the printing substrate. This xy value relates to positions within the print image which is to be transferred onto the printing substrate and corresponds substantially to the assignment of the threshold values to the pixels of the multilevel map.

The ordinate of this 2D graph is formed by the possible values which can be assigned to the pixels of the multilevel map. The maximum value is, in particular, taken into consideration hereby as well and is accordingly added to the pixels. The product of the total number of all threshold values and the largest possible value, i.e. the maximum coverage of a pixel, for example by droplets of ink, thus corresponds to a tonal value of 100% of the color separation of the printer-ready copy at this image dot.

It can, in particular, be provided that each threshold value is assigned a maximum number of values depending on the possible tonal values of the image dot.

These maximum values are used to fix the value of the pixels for all possible tonal values of the printer-ready copy.

Furthermore, it is possible for a non-linear assignment of the values of the pixels to the amount of ink applied in the printing process onto the printing substrate to conform with the 2D graph by representing the ordinate, in particular, in a non-linear fashion, i.e. by distorting the spacing between the possible values of the pixels in the multilevel map.

A curve is next plotted on this graph to fix the value of a pixel in the multilevel map. The curve represents a specific tonal value. Each threshold value is assigned a value of the pixel in the multilevel map by the curve. This value results from the position of the threshold value on the abscissa axis and the value on the ordinate axis assigned by the at least one curve. The value of the pixel of the multilevel map thus results from the y value of the curve at the x value of the assigned threshold value. The curve plotted by the graph can thus individually conform to required distributions of the values of the pixels in the multilevel map in order to optimize the print image.

When considering the y value of the curve, i.e. the value on the ordinate axis, it is particularly advantageously provided that this y value is rounded so that a whole number is always supplied as a value for the pixel in the multilevel map. This value can thus correspond, in particular, to the number of inkjet drops on this screen dot.

In a rasterization process for rasterizing printer-ready copy in multilevel maps, it can be laborious and time-consuming to calculate in each case the value of a pixel depending on the tonal value and the threshold value through the curve on the fly, i.e. when creating the multilevel map. In accordance with an additional mode of the invention, in order to reduce this complexity, it is provided in an embodiment of the invention that each of the threshold values is assigned a list of tonal values. The list indices then correspond to the values of the pixels in the multilevel map. The length of the list then results from the maximum number of values which are possible for a pixel.

The location of the individual tonal values in the list of a threshold value can thus result, in particular, from curves which are assigned to different tonal values and in which, preferably after the rounding described above, one drop more or less is in each case predetermined, i.e. a value for the pixel that is reduced or increased by one. This assignment of the lists to the threshold values can then preferably be determined on a one-time basis for the printing process and the threshold value matrix being used.

When the printer-ready copy is rasterized by the RIP, each image dot of the printer-ready copy is assigned a position within the threshold value matrix. By comparing the tonal value of this image dot with the tonal values of the individual threshold values, the value of the pixel can then in each case be determined by the associated list index, where the tonal value is for the first time greater than the associated tonal value of the list. The thus determined value is assigned to the pixel in the multilevel map which results from the position of the image dot in the printer-ready copy. It can, of course, alternatively be provided that the associated list index is determined by the tonal value, where the tonal value is for the first time lower than the associated tonal value of the list.

In accordance with yet another mode of the invention, straight lines or line segments with a slope other than 0 are advantageously used as curves in the 2D graph, with the slope in a particular embodiment being dependent on the tonal value and, in particular, increasing itself with an increase in the tonal value. This advantageously allows a large distribution of values of the pixels, i.e. for the number of inkjet drops, to be supplied in the multilevel map in the case of tonal values in the middle range.

Although on one hand a family of curves with fixed slopes can already be predetermined automatically for different tonal values, it is provided in a particularly advantageous embodiment that an operator can predetermine the slope of the curves individually for specific tonal values or ranges of tonal values, or that the operator varies or can vary predetermined or already input slopes.

The selection options provided by the process thus include not only the slope of the curves but also the shape of the curves and, in particular, it should preferably also be possible for the operator, as already mentioned, to be able to freely select a threshold value matrix that underlies the assignment process from a group of threshold value matrices.

If slopes of the curves are predetermined only for selected tonal values, slopes for ranges of tonal values which lie between the tonal values specified can in turn be calculated by interpolation, with the predetermined tonal values representing interpolation points. It is, in particular, provided hereby that the curves which can be selected, specified or varied do not intersect in the graph.

In a preferred embodiment it is provided that a quantity of slopes of the curves are predetermined and assigned to specific tonal values. Multilevel maps are then generated through the use of these curves from predetermined tonal values for specific image dots or ranges of image dots, with a printing substrate then being printed in a multilevel printing process depending on these multilevel maps, wherein, in particular, printer-ready copy is to be used therefor which, in a first step, includes a defined number of tonal values in order to make it possible for the resulting print image to be compared optically with an original in these ranges of differently predetermined tonal values. An operator can then, depending on this comparison, match the slope of at least one curve in order to match the resulting tonal value and the appearance of this tonal value to the original. This process can be repeated so that an optimized family of curves is generated for a printing process. These are, in particular, interpolation points of a family of curves for specific tonal values. These can then be saved. Slopes and points of associated curves can then be calculated by interpolation for tonal values for which no curves can be stored directly. In this way optimized curves and possibly lists of tonal values from these curves for the threshold values can be constructed which are then called up in further printing processes.

In accordance with yet a further mode of the invention, in order to ensure that it is not necessary to conduct new assignment processes or calculations of values for pixels in each case depending on the tonal value and the list of tonal values of a threshold value of a threshold value matrix, it is provided in a particularly preferred embodiment of the invention that a substantially complete multilevel map is in each case stored instead of the list of threshold values for substantially each tonal value. The dimensions of the multilevel map thus correspond to the dimension of the threshold value matrix. These constructed and stored multilevel maps are also referred to as gray tiles, are preferably saved in a memory assigned to the RIP and are called up from there for the rasterization of the printer-ready copy. During the rasterization, each image dot of the printer-ready copy is then assigned, depending on its tonal value, a portion of a gray tile that corresponds by extension to the area of the image dot in a multilevel map. The values of this portion then correspond to the values with which a pixel is printed on a printing substrate.

With the objects of the invention in view, there is also provided a device, comprising a printing machine, a raster image processor for carrying out a process according to the invention by generating the multilevel map having the pixels, and a screen assignment device assigning a value to a pixel of the multilevel map generated by the raster image processor.

The values of the multilevel map can be generated by this assignment alone and, in particular, this happens depending on the threshold values, assigned to the pixels, of a threshold value matrix and on the predetermined tonal values of an image dot of printer-ready copy.

In accordance with another feature of the invention, in order to allow the assignment of curve courses or slopes of curves to the predetermined tonal values to be checked and optimized, the screen assignment device is constructed in a further embodiment in such a way that it has at least one input member, the input member including predetermining elements with which an operator can predetermine curve courses or slopes with which the assignment of the values of the multilevel map is fixed or influenced.

In accordance with a concomitant feature of the invention, in order to support the evaluation and input of the values for the curves or curve courses, the screen assignment device furthermore has a display member with which properties and/or curves are displayed which fix or influence the assignment of the values of the multilevel map.

Other features which are considered as characteristic for the invention are set forth in the appended claims.

Although the invention is illustrated and described herein as embodied in a multilevel printing process and device using a raster bitmap and assignment method for multilevel screens, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a schematic and block diagram showing an inkjet printing machine with a screen assignment device;
FIG. 2A is an illustration of a threshold value histogram;
FIG. 2B is an illustration of a multilevel map;
FIG. 2C is an illustration of a raster bitmap.

DETAILED DESCRIPTION OF THE INVENTION

Figure 3:
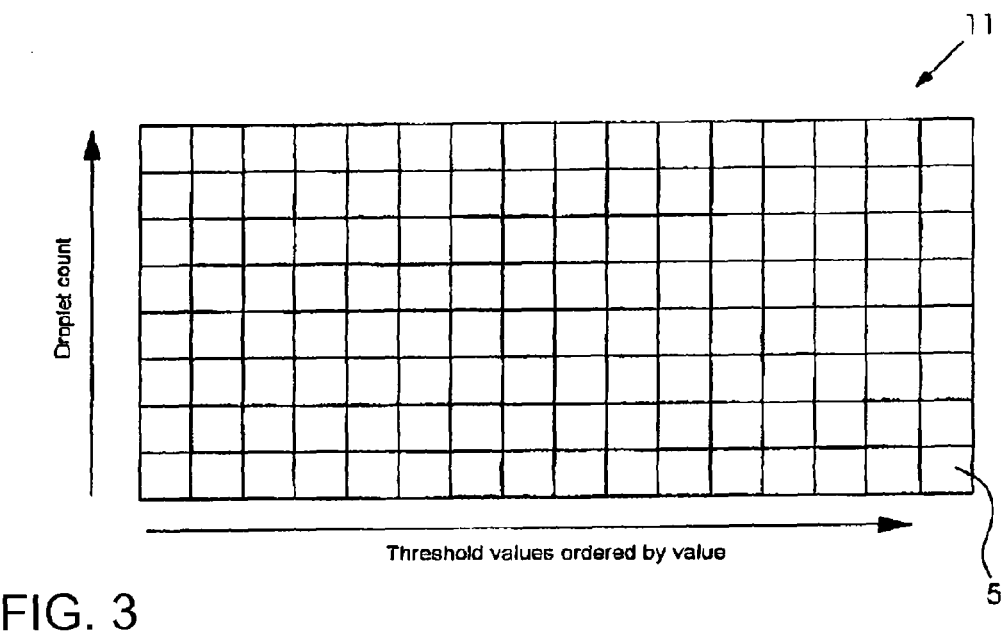
FIG. 3 is a graph showing droplet count plotted against threshold value.

Referring now in detail to the figures of the drawings, showing an embodiment of the invention from which features become evident but to which the invention is not restricted, and first, particularly, to FIG. 1 thereof, there is seen an example of a construction of a printing machine in the form of an inkjet printer 3 to which imaging data in the form of a multilevel map 9 (see FIG. 2B) are supplied through a screen assignment device 2. The screen assignment device 2 works for this purpose together with a raster image processor (RIP) 1 and can, in particular, also be a component of the RIP 1. FIG. 2C shows, by way of example, a bitmap as used for example in conventional offset printing. Values of individual screen dots 5 in this case are represented as bits 6, which can be 0 and 1.

The multilevel map 9 to be constructed is formed by the RIP 1 in conjunction with the screen assignment device 2 from a printer-ready copy 40 according to a color separation for individual printing colors of the inkjet printer 3. Color separation can, as described above, also be understood to mean that the values for the different printing colors are mapped in a common multilevel map 9 according to particular configuration protocols.

The screen assignment device 2 is furthermore connected to a screen preparation device 50 which for operation is connected to input members in the form of a keyboard 41 and a mouse 42. Through the use of the screen preparation device 50, screen assignment instructions are generated and stored, which are used by the screen assignment device 2 for allocating values 10 of the multilevel map 9 to the image dots of the printer-ready copy 40. The generation of the screen assignment instructions is thus preferably effected just once depending on a predetermined threshold value matrix 7 so that the screen assignment device 2 can always quickly access already predetermined screens, prepared by the screen preparation device 50, for allocating tonal values of the image dots of the printer-ready copy 40 to multilevel maps 9.

Settings and changes to the settings of rules of the screen assignment in the screen assignment device 50, which also includes the selection of suitable threshold value matrices 7, are displayed on a monitor 43 which is connected to the screen preparation device 50 as a display member.

FIG. 2A shows part of a threshold value matrix 7 in which threshold values 8 are assigned to the individual dots or pixels 5. The threshold values can, in principle, have any values.

When a raster cell with a size of 8×8 pixels, i.e. 8×8 screen dots 5, is assumed, a maximum of 256 different threshold values can be obtained with which 267 different tonal values can be represented. The threshold values 8 can, for example by their position in the threshold value matrix 7, be assigned XY values which correspond to pixels 5 on the surface to be imaged, for example a sheet of paper or a printing form. The complete surface can thus be inferred from one or more threshold value matrices 7, in particular, by tiling.

With the printer-ready copy 40, image dots of the printer-ready copy 40 are predetermined for the RIP 1, with a tonal value being assigned to each image dot for each color separation of the printer-ready copy 40. The tonal value can be stated as a percentage of the maximum surface coverage of the image dot with the color of the color separation. If the color value or tonal value in this case is 40%, for example, this should result in a multilevel map 9 which is generated by the screen assignment unit 2 with a coverage of 40%. In FIG. 2C a known raster bitmap 4 from the prior art is shown, and with such a raster bitmap 4 a 40% coverage would result in 40% of the pixels 5 that are represented in this case by bits 6 being written and consequently being covered with a 1. The other bits remain provided with a 0. Such a filled-in raster bitmap is not shown herein and instead, for clarity's sake, just a general raster bitmap 4 with place holders is shown. The assignment protocol for covering the pixels 5 is given in the raster bit map 4 by bits 6 with values of 1 or 0 and results from a threshold value matrix or histogram 7 that in principle can take any form, as shown in FIG. 2A. The values 0 to 255 in this case are assigned to the individual pixels 5. The threshold values 8 are thus generated by special generating devices and a process for generating threshold value matrices 7 that are not described in more detail herein. Now, if 40% of the bits 6 of the raster bitmap 4 are to be imaged, the imaging protocol is read from the values of the threshold value matrix 7. A tonal value of 0% thus corresponds to none of the pixels 5 being imaged, and 100% means that all pixels 5 are imaged. Tonal values between 0 and 100% are calculated proportionately by the imaging of pixels 5 corresponding to the threshold values 8. This assignment of bit values or bits 6 to the pixels 5 of a printing form is effected in the screen assignment unit 2 that is typically integrated in the RIP 1 which can be implemented in hardware or as software.

If values 10 are now to be assigned to the pixels 5 according to a multilevel map 9, which can lie between 0 and a value greater than 1, then a conventional assignment process in the RIP 1, which assigns values between 0 and 1, cannot be used.

Screen values 10 are assigned to pixels 5 through the use of the screen preparation device 50 in accordance with assignment protocols depending on the threshold values 8 of the threshold value matrix 7 and on the tonal value of an image dot of the printer-ready copy 40. The values 10 then represent the different tonal values which can be assigned to an individual pixel 5 in a multilevel map 9 through the use of the inkjet printer 3. Such an assignment of values 10 to the multilevel map 9 is preferably effected just once inside the screen preparation device 50 for all of the possible tonal values that an image dot of any printer-ready copy 40 can have. These assignment rules, which can be stored in different ways, are then transferred to the screen assignment device 2. The only further operation that then takes place inside the screen assignment device is a matching of the tonal values of the individual image dots of the printer-ready copy 40 with the stored assignment rules that are generated in the screen preparation device 50, and the "appropriate" multilevel map 9 is then assigned directly to the corresponding image dots without further calculations. FIG. 2C shows a corresponding multilevel map 9, with values between 0 and 7 being provided in this case as possible values 10 and representing 8 different tonal values for the pixels 5 which can be printed in the inkjet printer 3. The higher the number of ink drops that can be delivered by the inkjet printer 3 to a pixel 5, the greater the maximum value 10. This maximum value 10 is thus, in particular, also dependent on the possible total quantity of ink that can be deposited on a pixel 5 of the printing substrate.

FIG. 3 shows a graph 11 in which the threshold values 8 of the threshold value matrix 7 are represented on the x-axis, in this case in increasing order of size. The positions of threshold values 8 of the same size, which are possible depending on the rasterization process or threshold value matrix, are thus to be derived from the average value of adjacent threshold values 8. The Y-axis is determined by the possible droplet count which can be delivered by the inkjet printer 3 per pixel 5. In the 2D graph formed in this way, by adding a curve for a specific tonal value, the droplet count for a pixel 5 with assigned threshold value 8 can then be determined by the Y-coordinate of the curve at the threshold value 8.

Figure 4:
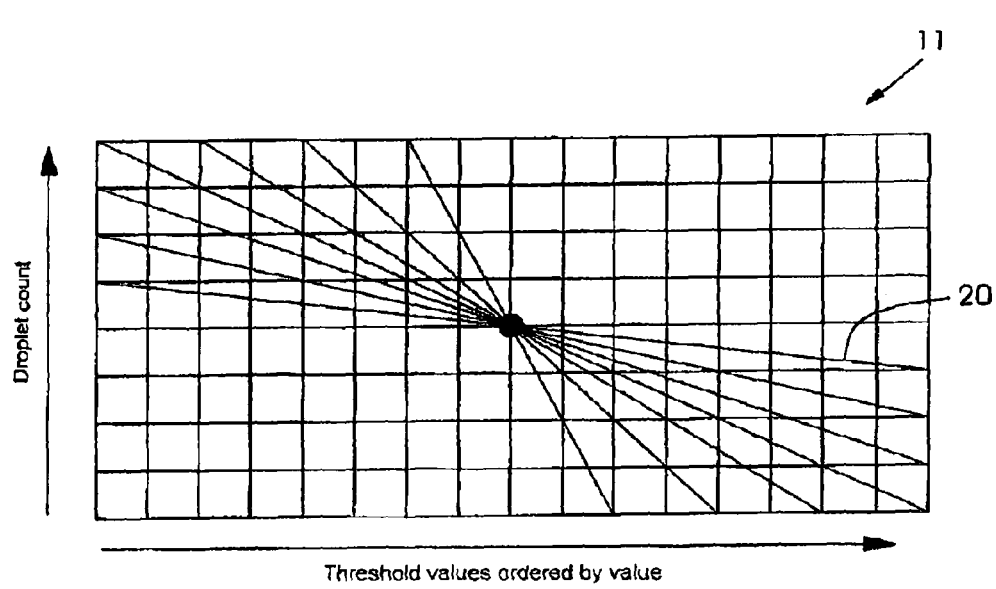
FIG. 4 is a graph showing a family of curves for value assignment of threshold values.

FIG. 4 shows a possible family of curves 20, which represent all of the 50% tonal values for an image dot of the printer-ready copy 40 with associated pixels 5. Depending on the slope of the curves 20 of the family of curves, more pixels in the range with low threshold values 8 are covered with a plurality of droplets, and pixels 5 with a high threshold value 8 are covered with fewer droplets, or vice versa. As a result, the ratio between the droplet count x of the pixels 5 covered with droplets and the product of the possible total droplet count and the total amount of screen dots gives the percentage coverage of the imaged printing dot at which the pixels 5 are located. In the example given in this case, the maximum total droplet count is 8, which means that in the case of a steep curve of the family of curves 20, the first 6 pixels 5 with low threshold values 8 are each covered with 8 droplets and the pixels 5 with threshold values 8 above the $10^{th}$ threshold value 8 are not covered with droplets at all. It must be emphasized in this case that the graph 11 with the family of curves 20 illustrated herein should only be taken as an example. In reality the maximum droplet count can vary and, for example, lie between 3 and 31. In the case of larger threshold value matrices, considerably more pixels 5 with considerably higher threshold values 8 can also be provided, in particular also identical threshold values 8.

Figure 5:
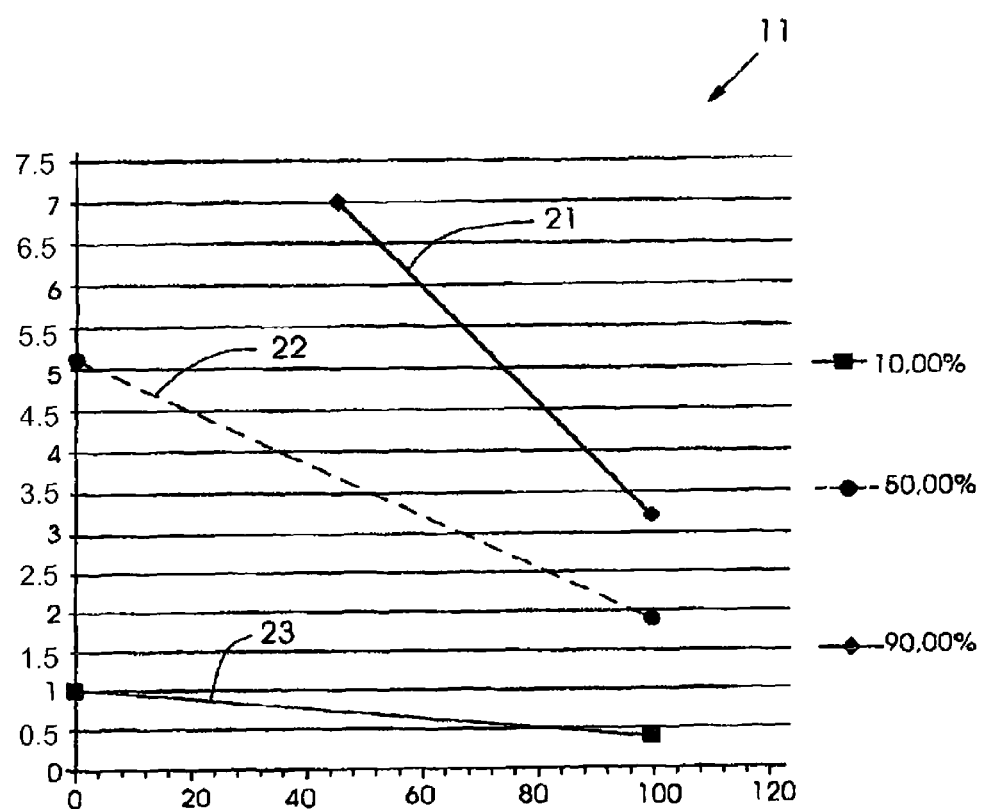
FIG. 5 is a graph showing examples of curves for value assignment.

In FIG. 5 curves 21, 22, 23 for different tonal values of 90, 50 and 10% are now shown, for example, wherein 7 droplets are assumed in this case as the maximum droplet count and the threshold values are limited or standardized to 100 for this example.

The slope of the curves 21 to 23 preferably increases from low to high tonal values, with the curves not intersecting within the graph itself. As can be seen, the course of the curve 23 for a tonal value of 10% is such that the number of droplets is one for a threshold value 8 of 1 and under 0.5 for a threshold value 8 of 100. The slope of the curve 22 for a tonal value of 50% is steeper, from a little over 5 droplets for the threshold value 1 to under 2 droplets for the pixel 5 with the threshold value 8 of 100. The curve 21 applies to a tonal value of 90% and assumes the maximum droplet count 7 for threshold values 8 of 1 to 60 and still stipulates a droplet count of over 3.5 for the threshold value 100.

Tonal values in ranges between 10 and 90% can then be calculated by curves with slopes between the slopes of the curves 21 to 23 shown herein and, for example, to do this a linear course of the slopes of the curves 21 to 23 can be assumed for tonal values from 0 to 100%. However, since a tonal value of 0% means no covering at all and a tonal value of 100% means that all pixels 5 are covered with the maximum droplet count, a linear course of the slope of the curves of a family of curves from 5% to 90%, or 95%, and a maximum of 99%, is preferably assumed.

As is apparent from FIG. 5, it is preferred that a curve 23 representing a low tonal value is very flat, and that a curve 21 for a high tonal value of 90%, as in this case, is very steep.

In the curve courses 21 to 23 which result from FIG. 5, pixels 5 have to be covered with numbers of droplets that are not whole numbers, in accordance with the position of the corresponding threshold values 8 on the X-axis.

Figure 6:
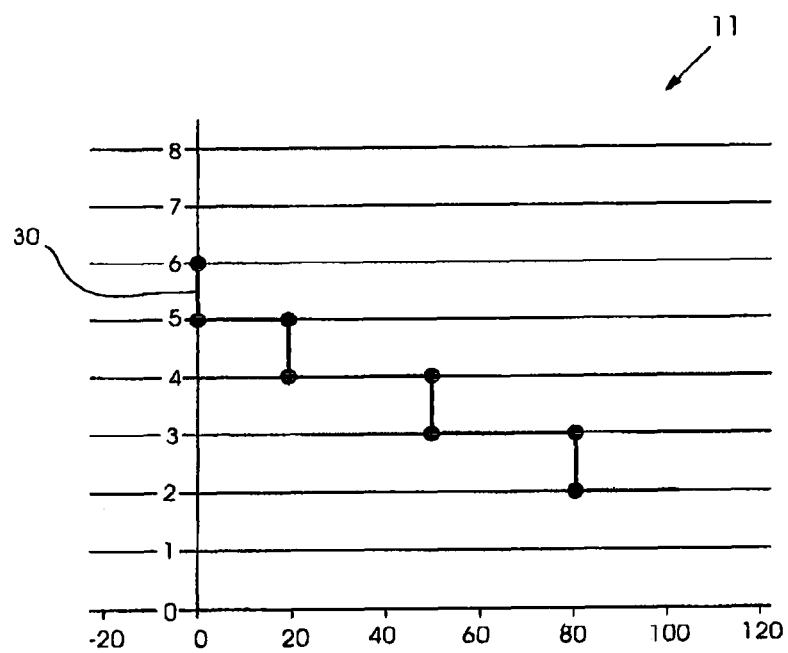
FIG. 6 is a graph showing a rounded assignment of values of the multilevel map to threshold values.

Therefore, in FIG. 6, a course is given by way of example for the curve 22 for the 50% tonal value, in which the droplet count for the individual pixels 5 depending on the indicated threshold value 8 is always rounded. Rounding in the sense of this invention is not to be understood as just simple rounding depending on the value of the curve 22 at a specific point on the x-axis. In the example shown herein, rounding is to be understood, in particular, as an averaging of the individual y values which are assigned to several x values in the graph 11, which results in a step function 30 that preferably has an at least similar integral to the curve 22 which it replaces.

In the process used in this case, it is first calculated to which, i.e. to how many, threshold values 8 an ink level, i.e. a value 10, or a droplet count of at least 1 is assigned. This number or this assignment results from the x value of the curve 22 at a droplet count of 0.5. If the resultant value is greater than 100, it is set at 100 in the example shown herein. Equivalent values can result in the case of other classifications or standardizations. In the case of the curve 22 shown, a value of 142 results, i.e. a droplet count of at least 1 is assigned to all threshold values.

The assignment for the droplet count of 2 results in a similar fashion from the value of the curve 22 at a y value of 1.5. This value is in this case 111 and is correspondingly set at 100. A droplet count of at least 2 is thus assigned to each threshold value.

In general, the number and thus the threshold values 8 which are assigned to a droplet count of t thus result initially from the y value of the curve 22 or of another curve for the value t−0.5, wherein the number is always limited to the highest possible number of standardized or actually present threshold values.

The values 81, 50, 19, 0 and 0 then result for the droplet counts 3, 4, 5, 6 and 7. The droplet counts 6 and 7 are thus not occupied, which is also inferred from the point 5.13 where the curve 22 intersects the y-axis. The values mentioned herein represent in each case the transition points of the step function 33 at which the latter always transitions into the next highest ink level, reading from right to left, i.e. to the corresponding droplet count. According to this protocol for the curve 22, the droplet count of 3 is therefore assigned in each case to the threshold values 8 in the range of 81 to 50 on the Y-axis of the graph 11.

The following droplet counts are therefore assigned to the threshold values 8 or to the pixels 5 assigned thereto according to the data given herein. In the range of 100 to 81 the value 2, in the range of 81 to 50 the value 3, in the range of 50 to 19 the value 4, and in the range of 19 to 0 the value 5. Droplet counts of 6 or 7 are initially not assigned according to this assignment. However, in order now to achieve as accurate as possible an assignment of the droplet counts to the threshold values 8 which corresponds to the predetermined tonal value, a different approach is made for the highest occupied ink level, i.e. for the largest droplet count used. The ratio of the total droplets set, less the highest ink level determined in this case, to the total number possible is initially calculated. A total of 700 droplets can be set in this case. The sum of the individual products, number of the threshold values 8 in the interval with the droplet count in the interval for the remaining droplet counts in this case comes to:

$$(100-81)*2+(81-50)*3+(50-0)*4=331.$$

The next ink level is set to the largest occupied droplet count in the interval up to 0.

The number of the threshold values 8 still to be occupied with the highest droplet count then results directly from the difference between the droplet count corresponding to the tonal value and the value calculated in this case. The required droplet count corresponds to the percentage of the tonal value of the maximum droplet count.

In order to represent a tonal value of 50%, 50%, i.e. 350, of the possible droplets must now be distributed on the pixels 5. The difference in this case is 19 droplets, i.e. 5 droplets are assigned in each case to the threshold values 8 of the Y-axis in the range from 0 to 19. Fortuitously, this corresponds in this case to the number calculated.

Alternatively, droplets that need to be used for the tonal value could also be obtained by covering pixels 5 with the next highest droplet count but this is disadvantageous if the highest possible number of droplets per pixel 5 is already assigned according to the calculation proposed above.

A special case arises for those curves 21-23 that have no value above 0.5. In this case initially no droplet would be used for the pixels 5 according to the calculation protocol. In order to obtain the required tonal value, the droplet count 1 is therefore assigned to a quantity of threshold values 8 in the interval of 0 to t', the number of which is in proportion to the total quantity of the possible droplets (700 in this case).

The rounding protocol described in this case results in the course of the stepped function 30 in FIG. 6 which determines whole-number droplet counts for all pixels 5 of an associated image dot of a printer-ready copy 40 depending on its tonal value.

In an alternative but not preferred rounding process, the droplet counts that are not whole numbers could each be assigned the nearest droplet count, then 5 droplets would be assigned to each pixel 5 up to a threshold value 8 that corresponds to 20% of the highest threshold value 8. 4 droplets would be assigned to the threshold values 8 of 20 to 50% of the maximum threshold value 8. 3 droplets would be assigned to the threshold values 8 of 50 to 80% of the maximum threshold value 8 and 2 droplets would be assigned in each case to the remaining threshold values above 80%. These droplet counts would also be assigned to the pixels 5 through the assigned xy values of the threshold values 8.

The possible total coverage of a raster cell with 100% of all threshold values 8 with 7 droplets in each case would be 700. Using the alternative covering process described in this case would result in a surface of 350 made up of 20% with 5 droplets, 30% with 4 droplets, 30% with 3 droplets and 20% with 2 droplets. The ratio of this surface coverage that would result of 350 to the total surface coverage of 700 is precisely 50% and would thus correspond to the predetermined tonal value of the image dot of the printer-ready copy 40. However, this slight deviation from the result of the preferred rounding process would lead to a modification of the interval under the curve 30 so that it deviates at least more markedly from the integral under the curve 22 than the integral according to the preferred rounding. An actual print image is therefore obtained using the preferred rounding that is closer to the selected or determined curve 22 than if an alternative rounding process were used.

For other curves 21, 23 or the like, similar stepped functions 30 result which predetermine the distribution of the droplet count for threshold value ranges of a threshold value matrix 7. The quantity of the stepped functions 30 thus calculated is provided by the assignment protocol for allocating the values 10 of the multilevel map 9 to the tonal values of the image dots of the printer-ready copy 40. A droplet count between 0 and the possible total value of the droplets is thus assigned to each pixel 5 through the multilevel map 9 according to a stepped function 30. If the maximum number of droplets is, for example, 7, then a multilevel map 9 as drawn in FIG. 2C can result. Components of a multilevel map 9 or multilevel maps 9 with the dimensions of threshold value matrices 7 which correspond to different tonal values of an image dot of the printer-ready copy 40 can be stored as so-called gray tiles so that the screen assignment device 2 assigns to an image dot, depending on the tonal value of this image dot, precisely one gray tile to which a corresponding distribution of ink droplets per pixel 5 on the printing substrate corresponds. The gray tiles themselves are generated as described just once in the screen preparation device 50. This can preferably take place under laboratory conditions.

In order to optimize the assignment process, in a first step a number of preferred curves 21 to 23 are predetermined and represented on a display device 43. The slopes of the curves and the droplet distributions resulting therefrom for selected threshold value ranges can, in particular, also be hereby indicated. A printer can then use a printer-ready copy 40 as a test form with test elements which map as great a range of tonal values as possible in order to allow them to be converted in an RIP 1 through the use of the assignment device 2 into one or more multilevel maps 9 or gray tiles. The operator can hereby also preset different rasterization methods, types of screen, screen angles and screen rulings through the input devices 41, 42 of the screen preparation device 50. According to initially proposed curve courses which, in particular, can also be dependent on the threshold value matrices 7 of the selected screens, the printer-ready copy 40 is rasterized and i.e. values 10 of a multilevel map 9 or a gray tile are assigned to the pixels 5 by the screen assignment device 2 according to the assignment protocol of the screen preparation device 50 which is described by the curves 21 to 23. Based on the multilevel map 9 or a configuration of gray tiles tiled next to one another which map the entire print image, the inkjet printer 3 is then actuated and generates on each pixel 5 a corresponding droplet count on the surface of a printing substrate. The print image thus generated by the inkjet printer 3 can then be compared with the printer-ready copy 40 and critical points or artifacts such as, for example, the formation of bands in specific tonal value ranges can be calculated. For all tonal value ranges, or also only for critical tonal value ranges, the operator can predetermine other curve courses of the curves 21 to 23 through the screen preparation device 50 through the use of the input devices 41, 42 and form a multilevel map 9 or a quantity of gray tiles directly by repeated assignment of the values 10 to pixels 5, on the basis of the threshold value histogram or histograms 7 taking into consideration the newly constructed curves 21 to 23, and reuse the multilevel map 9 or a quantity of gray tiles to print the printer-ready copy 40 through the screen assignment device 2. This process can be applied iteratively until a quantity of optimum curves 21 to 23 is calculated, which in conjunction with the inkjet printer 3 results in an optimized print image which is as free from artifacts as possible. The quantity of the curves thus calculated can be saved, for example for this inkjet printer 3. Tonal values between the optimally calculated curves 21 to 23 can be calculated, for example, by assuming a linear slope behavior of the curves between the interpolation values to be calculated. However, it is preferred that instead of the curves the gray tiles resulting from the curves are stored for a quantity of tonal values of the printer-ready copy 40 and are used for the assignment of values 10 to pixels 5 in subsequent printing processes.

In an alternative embodiment, lists can also be formed instead of the gray tiles. Each threshold value 8 of a threshold value matrix 7 is assigned a corresponding list. The indices, the list positions of the list, correspond to a value 10 of a multilevel map 9. This index therefore indicates how many droplets of ink are applied or assigned to the associated pixel 5 by the inkjet printer 3 or through the use of another printing or imaging process. In order to fix the values 10 for the pixels 5, the tonal values from which the droplet count corresponding to the index is to be applied are then entered at the corresponding list position. If, for example, the 20% tonal value is entered in the first position on the list of the threshold value 58, then this means that the pixel 5 which is assigned to this threshold value 8 with the value 58 is not assigned any value 10 of the multilevel map 9 for a tonal value range from 0 to 20%, and that the value 10 is then set only for a tonal value of more than 20%, and namely depending on the list position, i.e. with a value of the magnitude 1, a droplet is then applied to the pixel 5. If a 30% tonal value is entered in the second position on the list, then one droplet is applied in the tonal value range from 20 to 30% and two droplets above 30%. The length of the list, i.e. the highest index, is thus predetermined by the maximum number of ink levels, i.e. by the values 10, which can be mapped per pixel 5 in the multilevel printing process. The tonal values of the lists of the threshold values 8 are determined according to the curves 21 to 23 or their rounded equivalents 30 using the above-described process. A resulting multilevel map 9 for a subsequent printing process is then formed through the use of the screen assignment device 2 in accordance with the specifications from the screen preparation device 50 in such a way that a threshold value matrix 7 is assigned to individual image dots of a printer-ready copy 40. The values 10 of the multilevel map 9 are calculated by a comparison of the assigned threshold values 8 with the tonal value of the image dot. The values 10 are thus linked to the threshold values 8 through the xy coordinates of the pixels 5, the shade or coverage of which they indicate. Depending on the tonal value, these lists are also used to determine the values 10 of the multilevel map 9 for all pixels 5 depending on the threshold value matrix 7 used and the assignment process selected, in particular through the slopes of the associated curves 21-23, in such a way that no artifacts any longer occur, or are at least reduced, in the print image of the printing process, particularly for critical tonal value ranges.

By virtue of the thus calculated assignments of values 10 to the pixels 5 of a multilevel map 9 or to corresponding gray tiles of a printing process such as for the inkjet printer 3, artifacts such as, for example, the formation of lines in the print image can be at least minimized for different examples of a printer-ready copy 40 or for different tonal values within a printer-ready copy 40 on the basis of the optimized curve courses 21 to 23 and based on threshold value matrices 7 depending on the tonal values of the image dots, irrespective of the form in which the assignment was stored, whether as a gray tile or as a list, or whether the assignment takes place on the fly during the ripping in the RIP 1 by the screen assignment device 2.

The invention claimed is:

1. A process for printing printing substrates, the process comprising the following steps:

assigning pixels of a multilevel map to image dots of a printer-ready copy and assigning values to the pixels depending on a tonal value of the image dot, permitting n+1 different values to be assigned to each pixel, where n is greater than 1;

representing different amounts of ink of a printed pixel with the different values;

assigning threshold values of any threshold value matrix to the pixels of the multilevel map with respect to their positions relative to the printing substrate;

sorting the threshold values of the threshold value matrix in increasing or decreasing order;

assigning each threshold value an XY value for an imaging of the printing substrate;

representing an assignment of the values to the threshold values in the form of a 2D graph;

forming an abscissa of the 2D graph by the threshold value itself and forming an ordinate of the 2D graph by the value of the pixel of the multilevel map, with at least one curve being plotted on the graph and it being possible for the at least one curve to correspond, in particular, to a tonal value to be printed; and assigning to each threshold value a value of the pixels in the multilevel map resulting from the position of the threshold value on the abscissa axis and the value on the ordinate axis assigned by the at least one curve;

calculating tonal values of the image dot with color separation;

fixing the values of the pixels depending on the threshold value and on the tonal value of the assigned image dot; and printing the multilevel map on a printing substrate in a multilevel printing process.

2. The process according to claim 1, which further comprises establishing an assignment protocol according to which values are assigned to the pixels depending on the tonal value and threshold value in such a way that at least the values of two pixels in the multilevel map deviate from each other.

3. The process according to claim 2, wherein the deviation of the values of two pixels in the multilevel map is dependent on associated threshold values and the tonal value.

4. The process according to claim 1, which further comprises:
assigning a list of tonal values to each sorted threshold value, with list indices of the tonal values corresponding to the values of the pixels of the multilevel map and a length of the list being predetermined by a maximum number of values;
assigning a position in the threshold value matrix to each image dot of the printer-ready copy during rasterization of the printer-ready copy in a raster image processor;
determining the value with an associated list index by comparing the tonal value of the image dot with the tonal values of the list, where the tonal value is for the first time greater than the associated tonal value of the list; and
assigning the determined value to the pixel of the multilevel map resulting from the position of the image dot in the printer-ready copy.

5. The process according to claim 4, which further comprises:
using straight lines or line segments with a slope other than zero as curves in the graph;
predetermining the slope of the curves and/or varying the slope of the curves individually by an operator; and/or
increasing the slope of the curves with an increase in the tonal value.

6. The process according to claim 5, which further comprises:
instead of an assignment of maximum values to the threshold values, establishing a multilevel map with the dimensions of the threshold value matrix (a so-called gray tile) for substantially each tonal value;
storing the gray tile; and
during the rasterization of a printer-ready copy in the raster image processor, assigning a section of a gray tile that by extension corresponds to the area of the image dot in a multilevel map and can include an entire gray tile, to the image dots of the printer-ready copy depending on their tonal value.

7. The process according to claim 1, which further comprises:
using straight lines or line segments with a slope other than zero as curves in the graph;
predetermining the slope of the curves and/or varying the slope of the curves individually by an operator; and/or
increasing the slope of the curves with an increase in the tonal value.

8. The process according to claim 7, which further comprises:
instead of an assignment of maximum values to the threshold values, establishing a multilevel map with the dimensions of the threshold value matrix, a so-called gray tile, for substantially each tonal value;
storing the gray tile; and
during the rasterization of a printer-ready copy in the raster image processor, assigning a section of a gray tile that by extension corresponds to the area of the image dot in a multilevel map and can include an entire gray tile, to the image dots of the printer-ready copy depending on their tonal value.

9. A device, comprising:
a printing machine;
a raster image processor for carrying out a process according to claim 1 by generating the multilevel map having the pixels;
a screen assignment device assigning a value to a pixel of the multilevel map generated by the raster image processor;
said screen assignment device having at least one input member; and
said at least one input member having predetermining elements with which an operator can select or predetermine curve courses or slopes with which the assignment of the values of the multilevel map to the pixels is fixed or influenced.

10. The device according to claim 9, wherein said screen assignment device has a display member for displaying properties and/or curves which fix or influence the assignment.

* * * * *